B. Suits,
Riding Saddle,
No. 4,142. Patented Aug. 9, 1845.
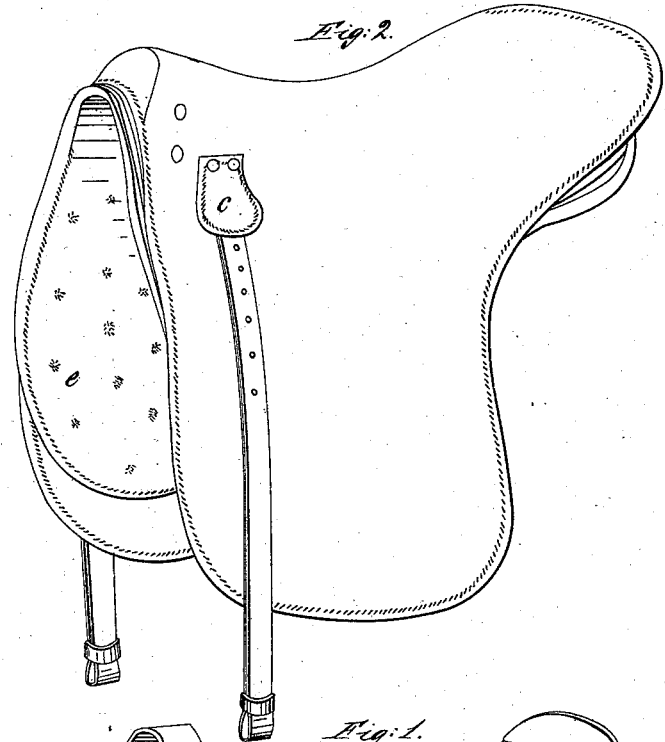
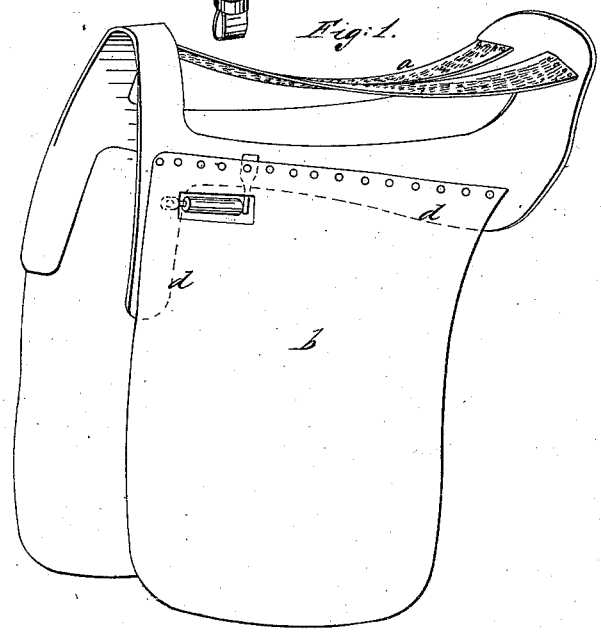

UNITED STATES PATENT OFFICE.

BENJAMIN SUITS, OF CHITTENANGO, NEW YORK.

SADDLE.

Specification of Letters Patent No. 4,142, dated August 9, 1845.

*To all whom it may concern:*

Be it known that I, BENJAMIN SUITS, of Chittenango, in the county of Madison and State of New York, have invented a new and useful Improvement in Saddles; and I do hereby declare that the following is a full, clear, and exact description thereof, reference being had to the following drawing, which forms a part of this specification, in which—

Figure 1, is a view of the saddle tree before the cover is put on. Fig. 2 is the saddle complete.

The nature of my invention consists in constructing saddles without any draw down jockey or small skirt and with or without a seam or seams through the center or other part of the seat.

The tree is made webbed and strained in the ordinary way. A skirt of the proper shape, size and thickness is then fastened to the outer or under side of the bar of the tree—the seat cloth is put on and the seat stuffed; the Fig. 1 represents a side view of the seat before it is stuffed.

$b$, is the skirt and the dotted lines $d$, show an outline of the tree. A cover of the proper size is then made and put over the whole saddle seat skirt and all and stretched to fit the seat and fastened to the skirt $b$, which is nailed to the tree this makes a smooth cover to the whole saddle as shown at Fig. 2. A small opening is made through this cover in the proper place to attach the stirrup straps to the tree in the ordinary way which are covered by a small piece of leather.

The pad (shown in drawing at $e$) is of common construction and attached in the usual way.

By the above construction I am enabled to stuff the whole tree over so as not to have any of the unpleasant ridges incident to the usual construction.

Having thus fully described my machine, what I claim as new and desire to secure by Letters Patent is—

Constructing the cover of the saddle in such a way as to allow the tree to be stuffed or covered with stuffing by making said cover in one piece so as not to present the projection of jockeys or small skirts or the ridges occasioned by the draw downs &c.

BENJN. SUITS.

Witnesses:
JAMES FRENCH,
L. D. DENNA.